Dec. 20, 1932.   H. L. BURKHARDT   1,891,499
TRANSMISSION GEARING
Filed Nov. 30, 1927   2 Sheets-Sheet 1

Inventor
Harry L. Burkhardt
Kwon Hudson & Kent
attys.

Dec. 20, 1932.   H. L. BURKHARDT   1,891,499
TRANSMISSION GEARING
Filed Nov. 30, 1927   2 Sheets-Sheet 2
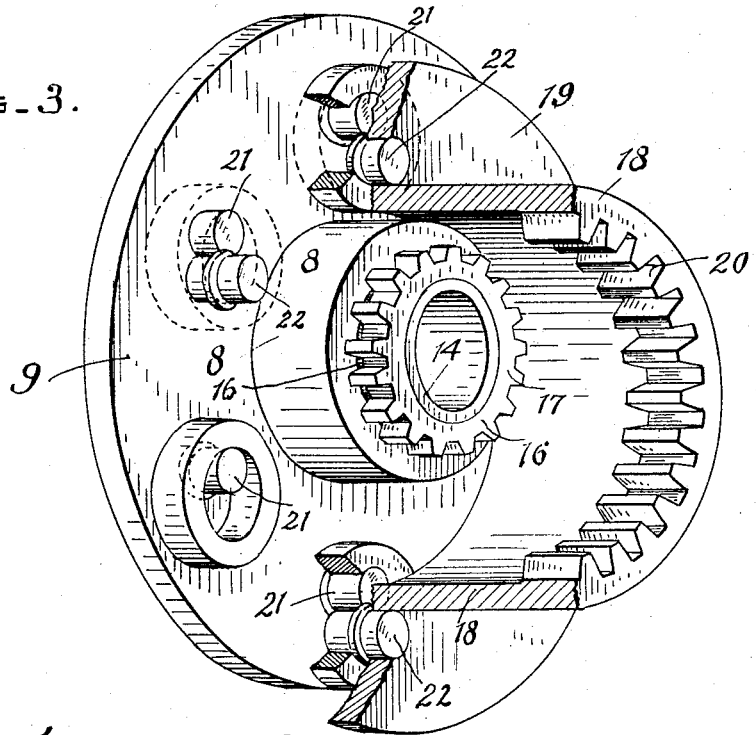
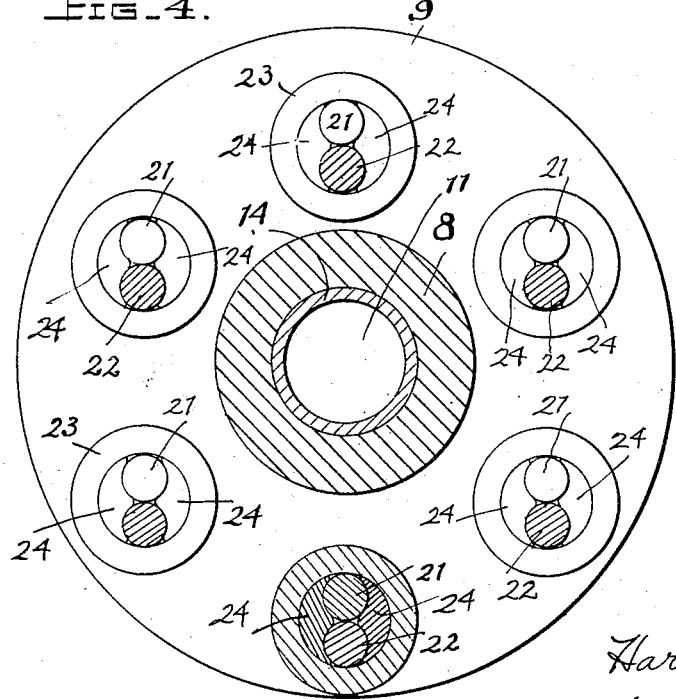
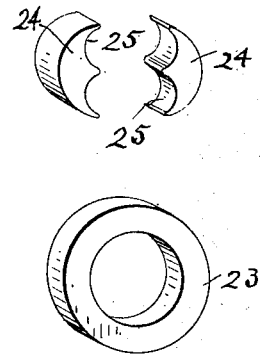
Inventor
Harry L. Burkhardt
Kwis Hudson & Kent
attys.

Patented Dec. 20, 1932

1,891,499

UNITED STATES PATENT OFFICE

HARRY L. BURKHARDT, OF CLEVELAND HEIGHTS, OHIO

TRANSMISSION GEARING

Application filed November 30, 1927. Serial No. 236,612.

This invention relates to a transmission gearing being particularly directed to a speed changing power transmission for transferring power from a drive shaft to a driven shaft.

The invention is particularly adapted for use upon automobiles, although there are many other uses to which it would readily lend itself. In a broader sense the present transmission will be particularly useful wherever it is desired to transfer the power from a driving shaft to a driven shaft in such manner that the angular velocity of the driven shaft would be equal to or greater than the angular velocity of the driving shaft. Of course, there are undoubtedly instances where it would be advantageous to reverse the ratio and have the driving shaft rotate with a greater angular velocity than that of the driven shaft. In such instances, however, it is quite apparent that the present transmission device could be readily reversed and the latter ratio obtained. Therefore, although the invention will be described with reference to the form of ratio first mentioned, it is nevertheless applicable to the latter form and should be so understood.

As above indicated, this transmission will be found to be most adaptable in connection with its use upon automobiles so, therefore, the present description will treat of the same as though used in such relationship, although it should be understood that this is only one of the many uses to which the invention may be put.

A common fault in automobiles has been that when the machine is traveling at a high rate of speed the engine has been correspondingly operating with a high number of revolutions. This rapid operation or racing of the engine causes excessive vibrations and noises in the automobile, besides being most injurious to the engine itself. The ordinary change speed transmissions for automobiles do not provide a ratio between the driving shaft and the driven shaft that will enable the engine to operate at a speed of revolution relatively slow in comparison to the movement of the vehicle.

The principal object of the present invention is to provide an auxiliary speed-changing transmission between the usual change-speed transmission and the propeller shaft of an automobile which enables the propeller shaft to be driven with an angular velocity equal to or greater than that of the driven shaft of the usual change-speed transmission, consequently permitting reduction of the speed of the motor for any given speed of the automobile.

A further object of the invention is to provide an auxiliary gear capable of being used as an over-drive or under-drive, in addition to the usual direct drive, and in which but one pair of gears is employed, thereby insuring quietness and smoothness of operation.

Other objects and advantages, in the nature of structural improvements and details resulting in economical manufacture, ease of assembly, and simplicity and compactness of design will more fully appear hereinafter as the description proceeds.

A preferred embodiment of the invention is shown in the accompanying drawings, wherein:

Fig. 3 is a perspective from the rear of the driving shaft, a portion of the driving shaft gear being broken away to show the driving connection between the members and the driving shaft pinion;

Fig. 4 is a transverse vertical section on line 4—4 of Fig. 1; and

Figs. 5 and 6 are detail views.

Figure 1:
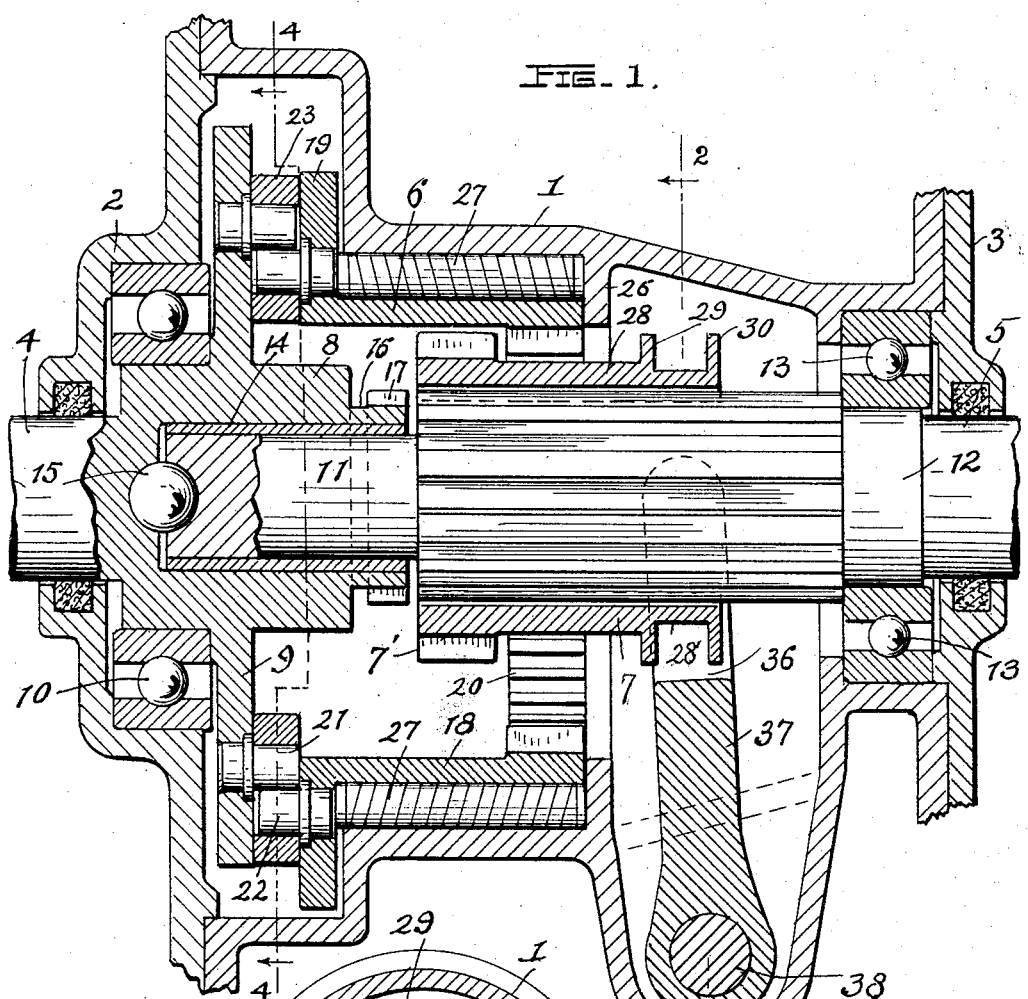
Fig. 1 is a longitudinal section through the transmission, portions of the driving shaft and driven shaft being shown in elevation.
Figure 2:
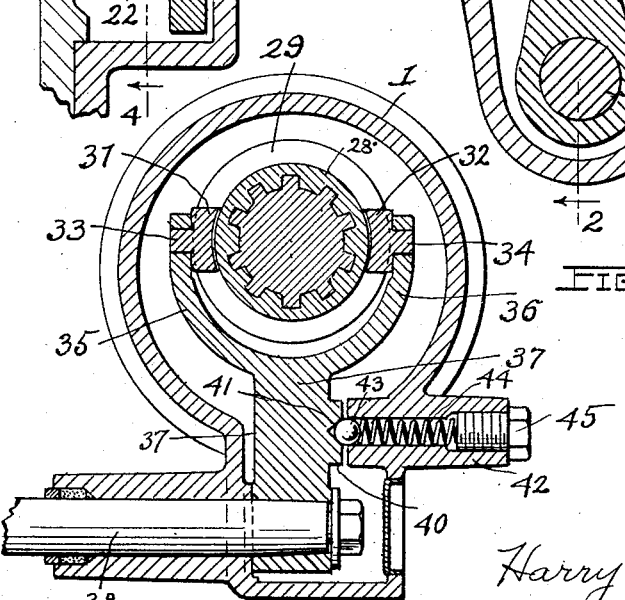
Fig. 2 is a transverse section taken on line 2—2 of Fig. 1.

The embodiment illustrated is adapted to be used upon automobiles and may be arranged thereon as a supplementary speed changing transmission in addition to the usual transmission. It may be arranged between the usual transmission and differential or it may be arranged in any other convenient position.

The transmission comprises in general a casing 1, cover plates 2 and 3, driving shaft 4, driven shaft 5, and the connecting members 6 and 7.

The driving shaft 4 enters the casing through suitable openings in the end cover plate 2 and is formed at its inner end with an enlargement 8. Extending substantially centrally from this enlargement and spaced inwardly of the plate 2 is an annular flange 9. Arranged between the enlargement 8 and an annular offset in the cover 2 is a ball bearing 10.

The driven shaft 5 extends into the casing through a suitable opening in the end cover plate 3 and has its forward end 11 reduced. An enlarged annular collar 12 on the shaft 5 is supported by and adapted to rotate in a ball bearing 13 arranged between the collar and the casing adjacent to the cover plate 3. The forward reduced end 11 of the shaft 5 is supported in a bushing 14 arranged within a recess in the enlargement 8. A thrust bearing 15 is interposed between the telescoped ends of the shafts 4 and 5.

The enlargement 8 of the driving shaft has a reduced portion 16 at its extreme rear end upon which there are splines 17, which may be integral therewith. The purpose of these splines will be explained subsequently during the description of the invention.

In order to obtain a drive between the driving shaft and the driven shaft, other than a direct one, the member 6 comprising a sleeve 18 carrying an internal gear 20 at one end, is used. The sleeve 18 is mounted in a roller bearing 27 in the casing 1 with its axis eccentric to the axis of the driving and driven shafts and having an annular outwardly projecting flange 19 at one of its ends. The flange 19 of the sleeve 18 is operatively connected to the flange 9 of the driving shaft by means of a series of cooperating pairs of pins 21 and 22. The pins 21 are secured to the flange 9 on the circumference of a circle concentric with the driving shaft 4, while the pins 22 are secured to the flange 19 on the circumference of a circle of the same diameter as that of the pins 21 but concentric with the gear 20. These pins are equally spaced around the circles on each flange and the respective pairs of pins are separated by a distance equal to the eccentricity of the gear 20 to the axis of the shafts 4 and 5.

These cooperating pairs of pins are joined together by freely rotatable rings 23 encircling each cooperating pair of pins. The inside diameters of the rings 23 must be so proportioned that the pins cannot separate a distance greater than said eccentricity. The rings will be in contact with the pins at all times and, since the pins rotate with the flanges and in the same direction, the rings will be carried around their own axes so that the contact between them and the pins will be entirely rolling with the result that there will be no slippage or appreciable wear. However, in order to definitely prevent any lateral displacement of the rings, filler blocks 24 of anti-friction material are arranged between the inside diameters of the rings and the two pins located therein. These filler blocks are provided on their inner faces with concave seats 25 fitting the pins 21 and 22. Besides preventing lateral displacement of the rings the filler blocks also serve to transmit power during that portion of the rotation of the flanges when the rings are inactive as a transmitting medium. Although six pairs of cooperating pins and six encircling rings therefor have been shown, it is obvious that this number might well be varied from a single pair to any number of such pairs of pins and rings that the available space will permit. However, to avoid dead centers, not less than two such pairs should be used. It is obvious that the rings 23 are, in effect, connecting links for the pins of the respective pairs.

Intermediate the ends of the casing an annular flange 26 extends inwardly and serves to hold the member 6 against rearward movement and the roller bearing is held against longitudinal displacement by the flanges 19 and 26.

The member 7 consists of a slidable sleeve 28 splined upon the driven shaft 12 and having a spur gear 7' thereon which may be integrally formed with the sleeve or it may be a separate gear member rigidly connected thereto.

Adjacent the opposite end of the sleeve 28 from that upon which the spur gear 7' is mounted, annular flanges 29 and 30 are provided for the purpose of forming a groove to receive shoes 31 and 32 therebetween. These shoes have their inner faces complementally concaved with respect to the bottom of the groove 28' and are loosely arranged so that the sleeve may freely revolve between them. The outer sides of the shoes are provided with pins 33 and 34 adapted to be pivotally connected to the arms 35 and 36, respectively, of a yoke member 37. The lower portion of this yoke member extends downwardly into the casing and is keyed or otherwise rigidly secured to an oscillatable shaft 38 so that it will have movement therewith. The shaft 38 is adapted to be oscillated by means of an operating lever, pedal or other member (not shown), whereupon the yoke will be correspondingly moved and the shoes 31 and 32 between the flanges 29 and 30 will cause the sleeve 28 to slide forwardly or rearwardly upon the shaft 5. In order to hold the yoke and consequently the sleeve in several predetermined positions of adjustment, one side of the downwardly extending part of the yoke is provided with a boss 40 provided on its outer surface with a plurality of recesses 41. The casing, upon the side adjacent to the boss 40 and in line therewith, has a boss 42 having a bore within which is arranged a detent consisting of a ball 43 adapted to be projected into the recesses 41 by a spring 44. The tension of this spring may be varied by means of a screw 45. This last described construction insures that the sleeve will be held in several desired positions of adjustment.

The gear 20 has a greater number of teeth than has the gear 7'. Therefore, when the gear 20 is in mesh with the gear 7' the driven shaft 12 will be driven with greater angular velocity than the angular velocity of the driving shaft. Hence, the meshing of these gears will enable the automobile to move at a relatively great speed although the engine will be operating at a relatively slow speed.

In effecting this meshing of the gears it is simply necessary to move the shaft 38 and consequently the yoke 37 in the proper direction so that the sleeve 28 slides rearwardly of the driven shaft whereupon the gear 7' will be brought into mesh with the gear 20. The spring pressed ball 43 will hold the gears engaged until further manipulation of the shaft 38.

It is often desirable to effect a direct drive between the driving shaft and driven shaft. In order to bring this about the sleeve 28 is moved forward on the shaft 5, by the yoke 37, to its full forward position of adjustment. When in this position the internal splines of the sleeve surround the reduced part 16 of the driving shaft 4 and mesh with the splines 17.

The sleeve 28 is shown in Fig. 1, in its neutral position, and when thus arranged there is no driving connection between the shafts 4 and 5.

From the foregoing specific description of the construction of the transmission, as well as of the operation thereof, it will be quite clear that the invention results in an extremely simple yet efficient arrangement whereby the angular velocity of the driven shaft may be stepped up with relation to the angular velocity of the driving shaft, or the two shafts may be so connected that they will have the same angular velocity of rotation. In this way the harmful racing of the engine, when the automobile is being driven at high speed, may be eliminated together with the excessive and disagreeable vibrations caused thereby in the body of the automobile. It naturally follows from the fact that the engine is being driven relatively slowly in comparison to the speed of the automobile that a material saving in gasoline consumption will be effected, as well as maintaining the engine at a cooler temperature. The invention also provides a simple arrangement whereby the driving shaft and the driven shaft may be arranged in axial alignment so that direct drive therebetween can be effected, and at the same time a driving gear may be operatively connected to the driving shaft which can be engaged with a gear on the driven shaft and effect a step up driving ratio between the two shafts. The means for connecting this driving gear with the driving shaft is simple and at the same time provides for a continuous and smooth operation.

Having thus described my invention, I claim:

1. In a transmission, a shaft and a gear, said shaft having a series of circularly arranged pins extending in one direction, said gear being offset with respect to the axis of the shaft and having a series of circularly arranged pins extending in the opposite direction from the pins on the shaft, the pins of each series being equal in number and functioning in cooperating pairs, freely rotatable rings encircling the pins of each pair and operatively connecting the shaft and gear, and filler members arranged in the free spaces between each ring and its pair of pins.

2. A transmission comprising a driving shaft having an annular flange, an internal driving gear eccentric to the axis of the driving shaft and having an annular flange, means for permanently coupling said flanges for rotation together at all times, splines on the rear end of the driving shaft, a driven shaft, a sleeve splined to said driven shaft concentric therewith and with the driving shaft, a gear carried by said sleeve, and means for moving said sleeve axially of the driven shaft whereby the gear carried by the sleeve may be meshed with the internal gear, the splines of the sleeve engaged with the driving shaft splines, or the sleeve operatively disconnected from the driving shaft.

In testimony whereof, I hereunto affix my signature.

HARRY L. BURKHARDT.